Sept. 22, 1936.   A. E. TILBURN   2,055,395
BRIDLE
Filed Sept. 27, 1934

Inventor
Albert E. Tilburn
by
Atty

Patented Sept. 22, 1936

2,055,395

UNITED STATES PATENT OFFICE 2,055,395

BRIDLE

Albert Edward Tilburn, St. Kilda, Victoria, Australia, assignor to Bitless Bridles Proprietary Limited, Melbourne, Victoria, Australia, a corporation of Victoria, Australia Application September 27, 1934, Serial No. 745,803
In Australia October 7, 1933

1 Claim. (Cl. 54—8)

This invention relates to bridles for the control inclusive of guidance of horses and other animals in riding or driving, and it has been devised more particularly with the object of dispensing with the usual inhumane and more or less harmful metal bit extending transversely through an animal's mouth, which bit is apt to chafe and cause injury to the animal and restrict the natural movements of the tongue and other mouth parts.

In the present invention the disadvantages of transversely extending bits in general use are avoided, and independent controlling elements which are not connected by bits or cross-pieces within the mouth are applied to opposite sides of a horse's mouth. The independent controlling elements are formed as hooked members, which are respectively engaged with the opposite ends of the animal's mouth. The bends of the hooked members are placed at the corners or inner ends of the animal's mouth, and one limb of each hooked member (hereinafter termed the inner limb) extends upwardly and inwardly within the animal's mouth and lies between the outer side of the molar teeth and the inner side of the adjoining cheek, while the outer limb of each of said hooked members lies along the outer side of the cheek and is secured to the cheek straps of the headstall.

The hooked control members may be of rigid constructions so that the inner and outer limbs thereof are in invariable spaced relation, or alternatively the hooked members may be of flexible construction to permit relative bending of the inner and outer limbs thereof. The outer limbs of said control members may be made of various lengths in accordance with the requirements of different animals, and their ends are provided with means for attachment of a rein ring or a cheek strap. Moreover, the outer limbs of said control members may be provided with means for attachment of a nose band and/or a chin strap. The inner limbs of said control members may also be made of different lengths to suit the mouths of various animals and they may be enlarged or flattened for portions of their lengths or otherwise appropriately shaped. Furthermore, the inner limbs of the said control members may be provided with coverings of rubber or other soft or relatively soft material, and the inner sides of the outer limbs of said members contacting with the horse's cheeks may be padded. In some cases, the soft coverings may be extended around the bends of the hooked control members and encase the outer limbs as well as the inner limbs thereof. Again, the inner and outer limbs of the said hooked control members may have coverings of different materials. Thus, for instance, the inner limb may be encased in rubber while the outer limb may be provided with a leather covering.

In order that the invention may be better understood reference will now be had to the accompanying drawing illustrating preferred forms of the invention.

In these views, 1 indicates the headstall of a bridle which may be made, as usual, of leather and is provided with a forehead strap 2, throat latch 3 and cheek-straps 4.

Figure 2:
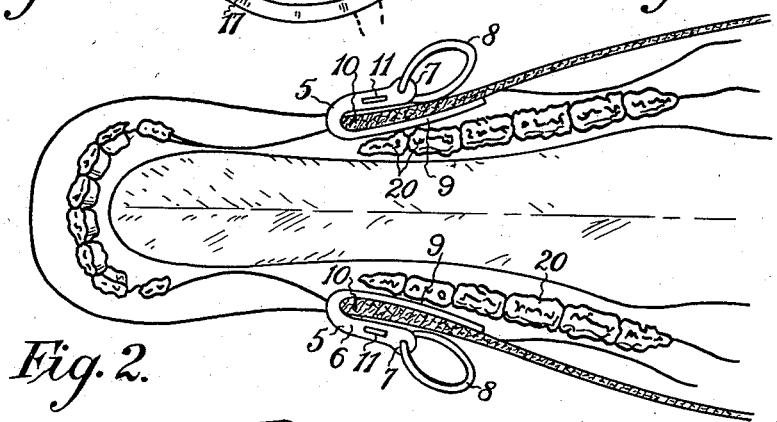
Fig. 2 is a sectional plan of portion of a horse's head showing the lower jaw and the hooked control members applied at the corners of the mouth.

Supported by the cheek straps 4 and disposed in extended alignment therewith are hook-shaped control members 5 which are of metal or other sufficiently strong material. The outer limb 6 of each control member 5 is formed with an eye 7 in which is mounted a ring 8 whereby the control member is connected with the relative cheek strap 4. The other or inner limb 9 of the control member 5 is located on the inner side of the cheek strap 4, and the inner and outer limbs 6 and 9 are so spaced from each other that when the said control member is engaged with a corner of a horse's mouth as shown in Fig. 2, the animal's cheek 10 is freely accommodated between them.

The outer limbs 6 of the said hook-shaped control members 5 may be encased in leather or like flexible material, and the leather or like covering may be sewn or otherwise secured to the said outer limbs. Moreover, the inner sides of the outer limbs 6 (or the coverings thereon) which contact with the animal's cheeks may be lined with soft material such as, for example, fur or felt.

The inner limbs 9 and the bends of the control members 5 may be enclosed in rubber casings of suitable thickness to provide the requisite softness for the parts of said members in contact with the mouth.

Figures 1, 4, 5:
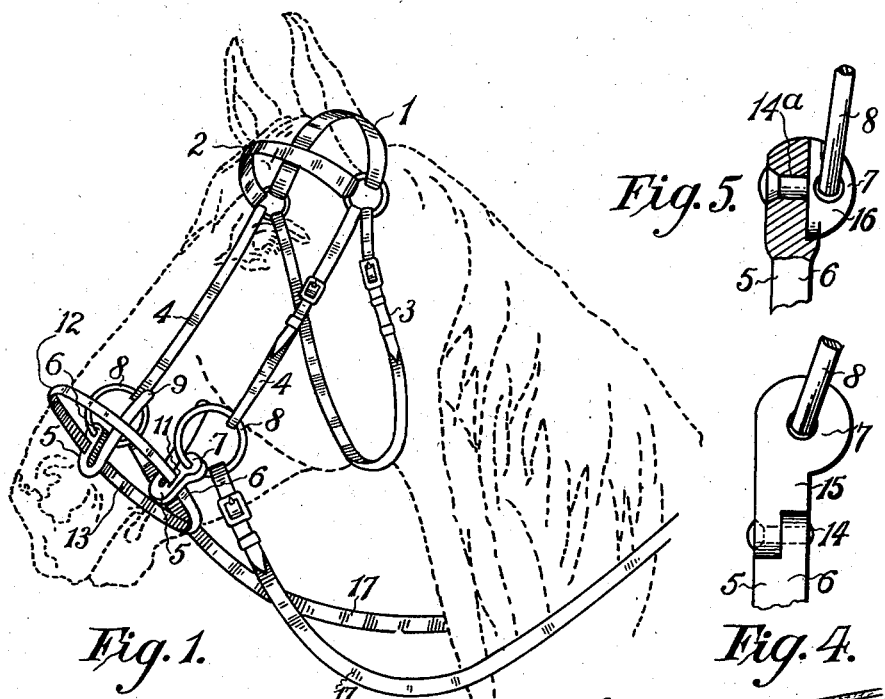
Fig. 1 is a perspective view showing the invention on a horse's head.
Figs. 4, 5 and 6 are fragmentary views of modified details in the construction of the hooked control members.

The outer limbs 6 of the control members 5 may be provided with slots 11 through which may be passed a nose band 12 and a chin strap 13, see Fig. 1.

In cases where it is desirable to provide the hook-shaped control members 5 with greater freedom of movement in order that they may readily conform with the movements of a horse's head, each of said members may be pivotally connected by a hinge pin 14 to an extension bar 15, see Fig. 4, or by a swivel pin 14a to a boss 16 as shown in Fig. 5. The extension bar 15 and the boss 16 are formed with the eye 7 through which the ring 8 passes as previously described.

Figure 6:
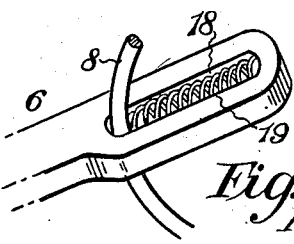

In order that pressure may be yieldably applied to the hook-shaped control members 5 by the reins 17 which are attached to the rings 8, the outer limb 6 of each of said control members may be provided with a longitudinal slot 18 in which the ring 8 is slidable, see Fig. 6. Springs 19 positioned in the slots 18 provide resilient resistance to the sliding movement of the ring 8 under tension of the reins 17 and thereby cushion and absorb shocks to prevent to a large extent their transmission by the control members to the corners of a horse's mouth.

In use, the headstall 1 is fitted on a horse's head in the usual way. The cheek straps 4 extend down opposite sides of the horse's head and the outer limbs 6 of the control members 5 contact with and extend along the animal's cheeks. The bends of the control members fit at the corners of the horse's mouth to which pressure is applied by said bends when turning or reining in. The inner limbs 9 of the hooks 5 extend upwardly and rearwardly within the horse's mouth and lie between the cheeks 10 and the molar teeth 20. If a throat latch 3 be used, any accidental dislodgment of the bridle as a whole is prevented, while the provision of the nose band 12 and chin strap 13 minimize danger of displacement of the hook-shaped control members 5 from the horse's mouth.

Figure 3:
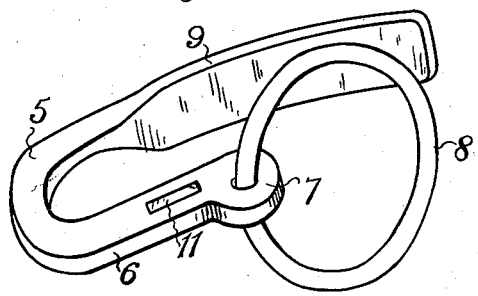
Fig. 3 is a perspective view of one of the hooked control members.

The end portions of the inner limbs 9 of the control members are preferably of flattened formation so that they lie snugly within the animal's mouth between the cheeks 10 and the molar teeth 20 as shown in Fig. 2, and the said inner limbs are slightly curved as shown in Fig. 3 to conform to the contour of the mouth.

The control members 5, when applied to a horse's mouth, are quite independent of each other and they are not connected in any way by cross-pieces such as would be apt to cause distress and to impede the movements of the horse's tongue by extending transversely through the mouth.

The invention has been described with reference to control members 5 of metal or other strong material, with or without coverings of suitable soft material such as rubber, but it will be understood that in some cases the said members 5 may be formed of rubber either with or without a core of suitable strengthening material.

What I do claim is:—

In a bridle, a control member comprising a hook having an inner elongated limb adapted to be inserted into an animal's mouth and lie between the animal's cheek and the adjacent teeth, an outer limb to be positioned against the outer side of the animal's cheek, and a bend connecting the inner and outer limbs adapted to contact with the corner of the animal's mouth, and a boss swivelly connected to the outer limb, said boss being formed for the reception of a rein ring.

ALBERT EDWARD TILBURN.